March 27, 1962     W. E. BRADLEY     3,027,219
ELECTRO-OPTICAL SIGNAL TRANSDUCER SYSTEM
Filed Dec. 19, 1958     2 Sheets-Sheet 1

INVENTOR.
WILLIAM E. BRADLEY
BY
Robert D. Sanborn
ATTORNEY

March 27, 1962     W. E. BRADLEY     3,027,219
ELECTRO-OPTICAL SIGNAL TRANSDUCER SYSTEM
Filed Dec. 19, 1958     2 Sheets-Sheet 2

INVENTOR.
WILLIAM E. BRADLEY
BY
Robert D. Sanborn
ATTORNEY

United States Patent Office 3,027,219
Patented Mar. 27, 1962

3,027,219
ELECTRO-OPTICAL SIGNAL TRANSDUCER SYSTEM
William E. Bradley, New Hope, Pa., assignor, by mesne assignments, to Philco Corporation, Philadelphia, Pa., a corporation of Delaware
Filed Dec. 19, 1958, Ser. No. 781,801
17 Claims. (Cl. 346—110)

The present invention relates to electro-optical signal transducer systems and more particularly to systems for producing a luminous indication, and a permanent record of such indication, which are representative of the instantaneous amplitude of a time variant electrical signal.

In the laboratory and elsewhere it is frequently necessary to make a record of the instantaneous amplitude of an electrical signal in a form that can be viewed with a minimum of equipment. In other instances it is desirable to provide a record of television picture signals, radar signals or the like in a form that can be viewed directly and without the necessity of running the record through complex scanning equipment. This can be accomplished by appropriately representing the variable amplitude electrical signal as a variable density image on a photographic film. In order to form the record it is first necessary to form a luminous spot having an instantaneous intensity or position which is representative of the amplitude of the signal and also to provide some means of varying the position of the spot with respect to the film so that each area of the film represents a unique time interval. In the past directly viewable records of the instantaneous amplitude of radar or television signals have been made by forming a radar or television image on the screen of a cathode ray tube and then photographing this image. Records of the instantaneous amplitude of an electrical signal other than radar and television signals, for example the voltage output of a signal generator or the like, have been made by forming an amplitude versus time image of this electrical signal on the screen of a cathode ray tube and then photographing this image. In many instances the detail present in the record may be limited by the characteristics of the indicator on which the image is formed. For example it may be necessary to tolerate a fairly large spot size on the indicator in order to achieve a bright image which will register on the photographic film. Another disadvantage of the prior art systems for forming a directly viewable image is that careful synchronizing may be required between the image forming system and the photographic equipment. A further disadvantage is that the functional relation between the modulating signal and the light delivered to the film is not dependable in form nor constant with time. Still another disadvantage of certain prior art systems is that the film must be exposed intermittently rather than continuously. As a result a record is made only of selected time samples of a signal rather than of the entire signal.

Therefore it is an object of the present invention to provide novel means for generating a scannable, variable intensity, luminous spot.

It is a further object of the present invention to provide means for generating a high intensity, scannable, luminous spot having a relatively small spot size.

Still another object of the present invention is to provide a novel signal recording system in which the intensity of a luminous spot may be controlled simultaneously by two separate time varying signals.

A further object of the present invention is to provide an improved system for introducing light into totally conducting filaments or "light pipes."

Still another object of the invention is to provide novel means for making a continuous photographic record of the instantaneous amplitudes of a signal.

An additional object of the invention is to provide a dependable, time invariant means of modulation of the intensity of a scanning light spot having a large dynamic range and a known functional form.

A further object of the invention is to provide a light source which varies in intensity with voltage over a very large dynamic range at very high time rates of change and without appreciable change of spectral content.

Still another object of the present invention is to provide a novel system for forming directly viewable records of television signals, radar signals, or the like without first forming a complete image.

These and other objects of the present invention are achieved by providing a novel electro-optical signal transducer system which includes a cathode-ray indicator tube and one or more light conducting filaments energized by the screen of the cathode ray tube. The first end or ends of the filament or filaments are disposed in a preselected array such as a straight line. The filaments extend from said first ends thereof across the face of the cathode ray tube, preferably in a spaced, parallel relationship, so that the side of each filament rather than the second end thereof is exposed to the energy radiated from the screen of the indicator tube. The longitudinal segments of the filaments which are adjacent the screen of the cathode ray tube include a material which will fluoresce in response to energy of the wavelength emitted from the screen of the cathode ray tube.

In certain preferred embodiments of the present invention the filaments are caused to have a selected attenuation per unit length in the region adjacent the screen of the cathode ray tube by incorporating a light absorbing substance into the filament. The intensity of the light emitted from the first end of any one filament may be varied by varying the intensity of the beam of the cathode ray tube, thereby to vary the excitation of the fluorescent material, and/or by deflecting the position of the beam along that filament thereby to cause the filament to be excited at a different point with respect to said first end. Different filaments can be caused to emit light by deflecting the beam so that different filaments are excited. A permanent record of the intensity of the scannable, variable intensity, luminous spot may be made by passing a photographic film over said arrayed first ends of the filaments so that it is exposed by the light emitted from said first ends.

For a better understanding of the present invention together with other and further objects thereof reference should now be made to the following detailed description which is to be read in conjunction with the accompanying drawings in which.

Figure 1:
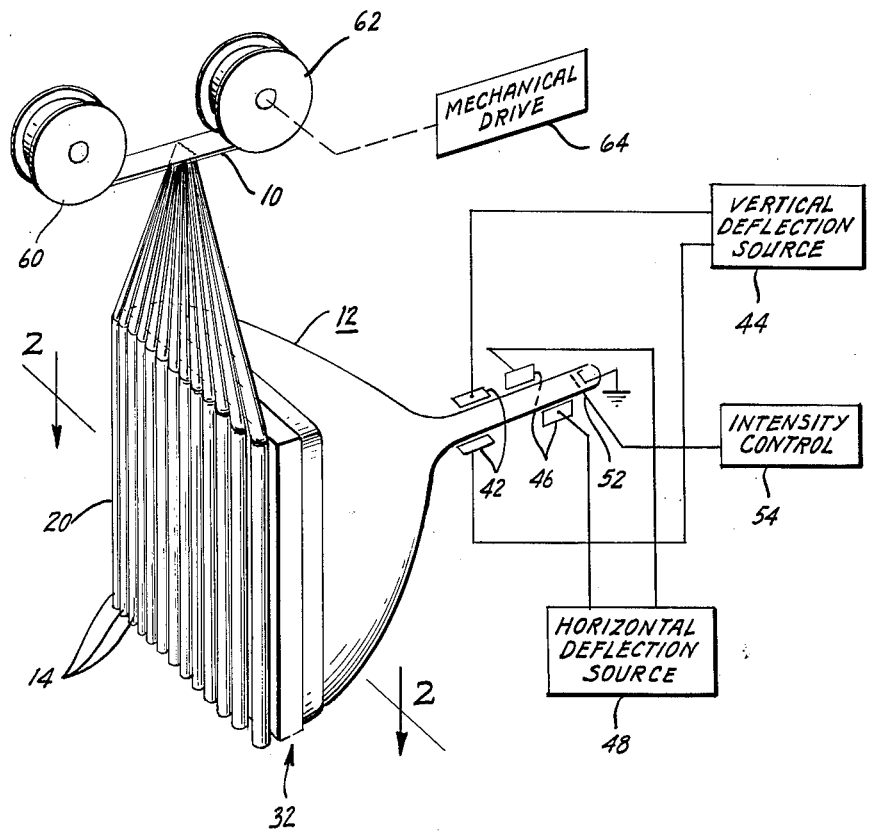
FIG. 1 is a pictorial representation of one preferred embodiment of the invention.

As shown in FIG. 1, one preferred embodiment of the invention comprises a photographic film 10 on which an image is to be recorded, a cathode ray tube 12 which is energized by the signal to be recorded and a plurality of light conducting filaments 14 for transferring signal intelligence from the screen of the cathode ray tube 12 to the photographic film 10. Filaments 14 are so-called "light conducting filaments" or "light pipes" which have the characteristic that a large fraction of light introduced at any point in the filament is totally reflected by the boundaries of the filament so that it escapes only at the ends thereof. Only the light which strikes the surface within the critical angle can enter or leave the light filament at the side thereof. All other light is conducted to the end of the light pipe or light conducting filament. Such filaments may be formed of glass or plastic having a high index of refraction. The light will travel in these filaments even though the filaments are twisted or bent with a relatively short radius. The number of light conducting rods or filaments 14 provided will depend upon the resolution desired on the film 10. One filament will be required for each resolvable area across the width of film 10. In some instances a relatively few rods of large diameter may be employed for exposing discrete regions on film 10. In other embodiments of the invention a much larger number of relatively fine filaments may be employed to provide more detail in the image recorded on film 10. For example, a system employed for recording a television video signal may employ 500 or more filaments arranged in the manner shown in FIGS. 1, 2 and 3.

Figure 2:
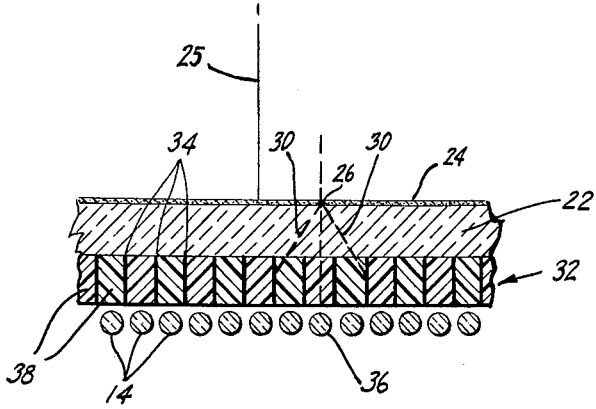
FIG. 2 is a cross-sectional view of the cathode ray screen and light conducting filament portion of the embodiment of FIG. 1 taken along the lines 2—2 in FIG. 1.
Figure 3:
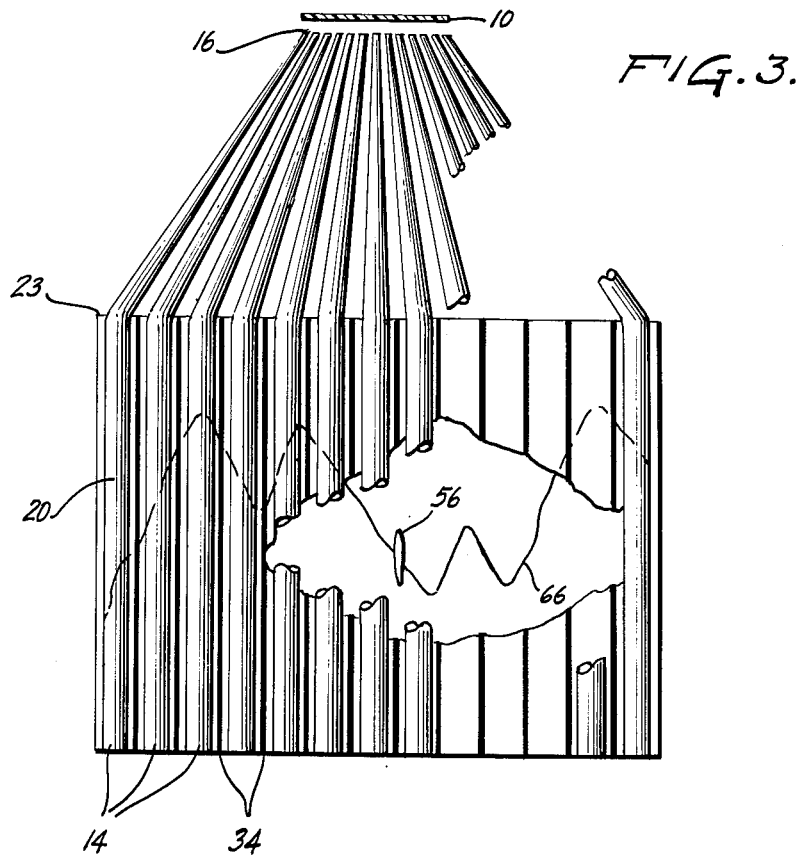
FIG. 3 is a view showing in more detail the arrangements of the light conducting filaments with respect to the screen of the cathode ray tube and the photographic film.

As shown in FIG. 3, first ends 16 of filaments 14 are disposed in a straight line adjacent the photographic film 10. The spacing between the first ends 16 and the film 10 should be small so that there is little if any overlapping of the areas of film 10 exposed by adjacent filaments 14. Filaments 14 may contact film 10 if this film is so constructed that the emulsion will not be damaged thereby. As shown in FIGS. 1, 2 and 3, the second end regions 20 of the filaments 14 are disposed in a spaced parallel array in front of the screen of the cathode ray tube 12.

The filaments 14 are shown in cross-section in FIG. 2 which is a fragmentary sectional view taken along the lines 2—2 of FIG. 1. The filaments 14 are spaced from the faceplate 22 of the cathode ray tube by a light shielding or collimating structure 32. The function of structure 32 will be explained in more detail presently. Turning now to FIG. 3 it will be seen that filaments 14 are bent along a line 23 so that the first ends 16 lie closer together than the second end regions 20. Filaments 20 are also shown as being tapered from the second end region 20 to the first end 16. This shaping of the filaments 14 concentrates the image appearing on the screen of indicator 12 into an area on the film 10 which is smaller than the screen of cathode ray tube 12. Since filaments 14 may be bent in any direction without any appreciable reduction in the light transmitted therethrough, the ends 16 may be placed in any convenient position adjacent the cathode ray tube 12 to facilitate the operation of the film transport mechanism.

There will be a minimum loss of light from the filaments 14 if they are supported only from their lower ends. While this may be possible if relatively large diameter filaments are employed, such support will not be adequate where a large number of small diameter filaments are employed. If small diameter filaments 14 are employed they may be supported by imbedding them in a rigid medium having a lower refractive index than the filaments 14. This rigid supporting medium has not been shown in the drawings in order to simplify the figures.

Turning once again to the sectional view of FIG. 2 it will be seen that the faceplate 22 of cathode ray tube 12 has a phosphor screen 24 deposited thereon which is capable of being excited by the cathode ray beam 25.

The filaments 14 are separated from faceplate 22 and screen 24 by the light collimating structure 32. The light collimating portion of structure 32 comprises a series of relatively thin opaque baffles 34 which are disposed perpendicularly to the faceplate 22. One such baffle 34 is disposed intermediate each pair of adjacent filaments 14.

The opaque baffles 34 should extend from the faceplate 22 far enough so that any excited spot on the screen 24 can illuminate only one or two adjacent filaments. As will be seen in FIG. 2, spot 26 illuminates only filament 36. Energy traveling along the divergent paths 30 is prevented from reaching other filaments 14 by the opaque baffles 34. The invention is not restricted to any particular construction for light baffling structure 32. However one simple means for constructing such a baffle is shown by way of example. As shown in FIG. 2, the light baffle may comprise a series of plastic strips 38 which completely fill the spaces between the opaque members 34. The opaque members 34 may be an opaque cement which holds the separate strips 38 together to form a rigid sheet-like structure. Alternatively, narrow slots may be milled or otherwise formed in a plastic plate and the slots filled with an opaque material.

The region 20 of each filament 14 includes a fluorescent material which may be mixed with the material which comprises the fiber before it is molded. This material should luminesce during excitation but should have little phosphorescence after excitation so that smearing of the image due to the motion of film 10 is held to a minimum. For example, it may be a manganese activated rhombahedral zinc-beryllium silicate which emits visible light when exicted by 3650 A.U. photons. Suitable materials of this type are described in Luminescence of Solids, H.W. Leverenz, published by John Wiley and Sons, Inc. Alternatively it may be one of the organic luminescent materials commonly added to plastics to make them fluorescent for scintillation counter use. Fluorescin has been used in acetates, acrylic resins and polystyrene. Eosine is a suitable material for use with polymethylmethacrylate fibers.

The phosphor employed on screen 24 is selected to have an emitted energy band in response to cathode ray bombardment which will excite the fluorescent material in the filaments 14. As an example, screen 24 may be a standard P–16 phosphor which has a peak output under cathode ray bombardment at approximately 3650 A.U. Structure 32 will channel this energy so that only one or possibly two filaments will be illuminated by this energy. The energy striking the filaments 14 will excite fluorescence within the filament itself. The degree of intensity of fluorescence will depend upon the intensity of the illuminating energy which depends in turn upon the current in the cathode ray beam which excites the screen 24. Because of the nature of the filaments 14 the light generated therein by the fluorescence will strike the walls of the filament at an angle greater than the critical angle. This light cannot escape the filaments except at the ends. Therefore much of the light generated in the portions 20 of filaments 14 by the action just described will travel down the filaments 14 to the first ends 16. This light will appear as a luminous spot at one point on the arrayed ends 16. The light will expose a selected portion of film 10, if present.

Region 20 of each filament 14 also includes a dye or other light absorbing material so that light is attenuated by a selected amount for each unit of distance traveled from the point of fluorescence to the first ends 16. As a result the amount of light reaching the first ends 16 will also depend upon the distance from the first ends 16 at which the filaments 14 are illuminated by screen 24.

The cathode ray tube 12 is provided with means for controlling the position and/or intensity of the cathode ray beam. Again the invention is not to be limited to any specific means for controlling the position of the beam or the intensity thereof. FIG. 1 shows schematically that a pair of vertical deflection plates 42 are provided for controlling the position of the beam in a direction parallel to the filaments 14 in region 20. Deflection plates 42 are connected to a source of vertical deflection signals represented by block 44. Similarly, a pair of horizontal electrostatic deflection plates 46 are connected to a source of horizontal deflection signal at 48. An intensity control element, in this case an intensity control grid 52, is connected to a source of intensity control signal 54. The nature of source 44, 48 and 54 will depend upon the uses to which the system of FIG. 1 is put. If the system is to be employed to record a television video signal, source 48 may provide a sawtooth scanning signal at the normal horizontal scanning frequency. Either source 44 or source 54 may comprise the source of the television video signal. That is, the video signal may be applied either to the vertical deflection plates 42 or to the intensity control 52. If source 44 represents the source of signals to be recorded, source 54 may be a bias source which sets the intensity of the beam at an optimum value. Alternatively it may be a source of correction signal for providing gamma correction of the signal before it is recorded. If source 54 represents the source of signal to be recorded, source 44 may be a source of gamma correction signal.

It should be understood that cathode ray tube 12 may be provided with magnetic deflection coils in place of the electrostatic deflection plates shown. Also that beam intensity control signal may be connected to the cathode instead of the control grid.

The irregular line 66 in FIG. 3 represents a path that spot 56 may follow as the beam of the cathode ray tube is deflected by the signals from sources 44 and 48. A portion of the filaments 14 and the light collimating structure 32 have been broken away in order to show the shape of spot 56 on the screen 24 of the cathode ray tube 12. The spot 56 has an elliptical shape the longer axis of which is disposed parallel to the longitudinal axes of the sections 20 of filaments 14. Forming the cathode ray beam into an elliptical shape permits a high beam current and consequently a high intensity beam spot without loss of resolution in the horizontal direction, that is, transverse to the sections 20. The elongation of the spot 56 in the vertical direction, that is along the longitudinal dimension of sections 20, does not reduce the resolution of the system since deflection of the beam in this direction changes only the intensity of the luminous spot appearing at the first ends 16 and not the position of this spot.

The system just described can be employed without the film 10 to generate a luminous spot of variable position and intensity. It may be used also with film 10 to make a continuous record of the position and intensity of the luminous spot. In recording the intensity of the spot the film 10 is moved across the first ends 16 at a preselected rate. The means for moving the film is illustrated schematically in FIG. 1 by film spools 60 and 62 and mechanical drive means 64 which is mechanically coupled to spool 62. Drive means 64 may impart either continuous or intermittent motion to spool 62 depending upon the type of recording to be made. Synchronizing means (not shown) may be provided between mechanical drive means 64 and one or more of the signal sources 44, 48 and 54. Synchronizing or signal transfer connections (not shown) may be provided also between two or more of the signal sources 44, 48 and 54.

Figure 4:
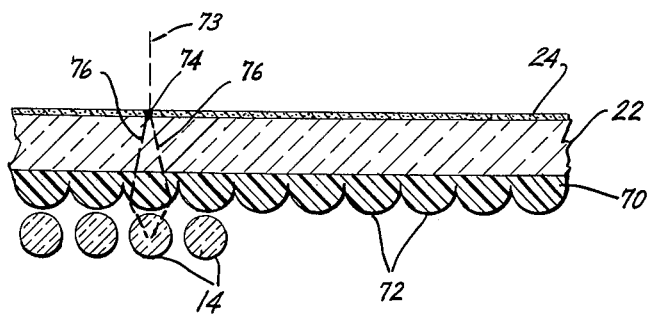
FIG. 4 is a cross-sectional view similar to FIG. 2 of a modified form of cathode ray screen and light filament assembly.

FIG. 4 is a cross-sectional view similar to FIG. 2 showing a second form of light shielding or collimating means that may be employed. Faceplate 22, phosphor screen 24 and filaments 14 correspond to similarly numbered elements in FIG. 2. The louvered light collimating structure 32 of FIG. 2 is replaced with a member 70 having a plurality of cylindrical lenses 72 formed thereon. One cylindrical lens 72 is provided for each filament 14. Each lens extends parallel to the filament 14 with which it is associated. Those familiar with lens elements of the type shown in FIG. 4 will understand that the action of the lens elements 72 will be to concentrate the light from a spot such as spot 74 on one filament 14. Broken lines 76 represent diverging light rays from spot 74 which are concentrated on one filament 14 by one of the lens elements 72. The lighter broken line 73 represents the cathode ray beam which impinges on screen 24 at spot 74.

The operation of the embodiment of the invention shown in the drawings is believed to be obvious from the above description. If a record is to be made of the amplitude of a time varying electrical signal, drive mechanism 64 may be caused to impart a continuous motion to spool 62. The signal to be recorded may be connected to deflection means 46 to cause the beam to illuminate a different filament 14 for each different amplitude of the signal. Timing marker signals may be supplied to intensity control 52 or deflection means 42 to provide timing indications of contrasting density on the film 10. Alternatively, the signal to be recorded may be supplied to the vertical deflection plates 42, in which case block 44 would represent the source of signals to be recorded. The horizontal deflection plates 42 may be provided with a sawtooth signal from source 48. Under the conditions just mentioned the spot 56 will trace a path such as path 66 in FIG. 3. The variation of the distance of spot 56 from the first ends 16 will produce a variation in the intensity of the spot appearing at first ends 16 owing to the finite attenuation characteristics of sections 20. The greater the attenuation per unit length the greater will be the variation in intensity of the beam at the first end as the position of the spot is varied. The attenuation must be low enough however to permit a registerable signal to appear at ends 16 even though the beam 56 is positioned adjacent the ends 14. If the filaments 20 have a constant attenuation per unit length the intensity of the spot will vary as an exponential function of the spot position. This exponential variation is advantageous since the density of the image recorded on the film is also an exponential function of light intensity. By properly choosing the attenuation in filaments 14 and the emulsion of film 10 the density of the recorded image may be made directly proportional to signal amplitude. Alternatively, the exponential nature of film and the light source represented by the filaments 14 may be combined to provide a desired exponential relationship between signal amplitude and density of the image on film 10.

The system just described will cause the film to be scanned in a transverse direction. If the film is caused to be in motion from spool 60 to spool 62 successive scans will be laid down side by side on film 10. It should now be clear that if the signal supplied to plates 42 by source 44 is a television video signal, and the sawtooth signal supplied by source 48 is at the normal horizontal scanning frequency, the image recorded on film 10 will be a photographic reproduction of individual frames of the television picture even though no image ever appears on the screen of indicator 12. As mentioned above, a gamma correction signal may be supplied from source 54 to the intensity control element 52.

It should also be clear that the video signal may be supplied to intensity control element 52 while the gamma correction signal or any other signal, such as a second video signal which is to be superimposed on the first signal, is supplied to deflection means 42. If the vertical deflection means is employed to modulate the intensity of the luminous spot, the intensity will be an exponential function of signal input owing to the constant attenuation per unit length characteristic of the filaments 14. If the control grid is employed to modulate the intensity of the luminous spot, the intensity will be a square law function of the input signal owing to the square law characteristic of the usual cathode ray tube intensity control.

Various changes may be made in the embodiment shown in the drawings within the scope of the invention. For example, filaments of uniform diameter may be employed in place of the tapered filaments 14. Also the ends 16 may be formed into an array other than a straight line. The light attenuation in sections 20 may be made non-uniform if desired by including different amounts of light absorbing substance per unit length to provide a relationship other than exponential between the position of the cathode ray beam and the intensity of the spot at ends 16. Alternatively or in addition, the distribution of fluorescent material in section 20 may be made such that different amounts or spectral compositions of light are emitted at different points within the sections 20 for the same intensity of illumination from cathode ray tube 12. In other embodiments of the invention two or more filaments may be positioned between the opaque segments 34. One or more of the filaments of each group may be employed to expose film 10 while one or more of the remaining filaments are employed to provide a directly viewable image or to expose a second film. In still other embodiments of the invention multiple filaments may be employed between each of the opaque members 34. The ends of the filaments may be arranged to form a character.

It also lies within the scope of the invention to employ only a single filament of the type described which is illuminated by a suitable cathode ray tube. A single line tube may be employed in this instance. The first end of the single filament will act as a source of light which will vary in intensity with voltage over a very large dynamic range at a very high time rate of change and without appreciable change in spectral content. The intensity variation with voltage may be made exponential or logarithmic as desired by varying either the position or the intensity of the illuminating spot. Again both the position and intensity of the existing spot may be varied to provide still a different functional relationship between input electrical signal and light output. One distinct advantage of the present invention is that the efficiency of conversion between the input electrical signal and the luminous output signal is relatively high.

Therefore, while the invention has been described with reference to a single embodiment thereof, it will be apparent that various modifications and other embodiments thereof will occur to those skilled in the art within the scope of the invention. Accordingly I desire the scope of my invention to be limited only by the appended claims.

What is claimed is:

1. A system for providing a luminous indication which is representative of the instantaneous amplitude of a time-variant signal, said system comprising a plurality of light-conducting members having first ends thereof disposed in a preselected array, said luminous indication being formed by the light emitted from said first ends, each of said light conducting members having material which fluoresces in response to the reception of energy at a selected wavelength distributed throughout an extended longitudinal region thereof, a source of energy at said wavelength, means associated with said source for directing said energy against a selected small portion of the longitudinal surface of selected ones of said light conducting members thereby to illuminate said light-conducting members with said energy, said illumination taking place at said fluorescent regions of said members, signal responsive modulating means for modifying the illumination of said light-conducting members in accordance with the amplitude of a signal supplied thereto thereby to modulate the intensity of the light emitted from said first ends, and means for supplying said time-variant signal to said modulating means.

2. A system for providing a luminous indication which is representative of the instantaneous amplitude of a time-variant signal, said system comprising a plurality of light-conducting members having first ends thereof disposed in a preselected array, said luminous indication being formed by the light emitted from said first ends, each of said light conducting members having material which fluoresces in response to the reception of energy at a selected wavelength distributed throughout an extended longitudinal region thereof, a source of energy at said wavelength, means associated with said source for directing said energy from said source against selected portions on the longitudinal surfaces of said light-conducting members in a selected sequence in the region including said fluorescent material, and signal responsive means for modulating the intensity of illumination of said members by said source in accordance with the amplitude of a signal supplied thereto, thereby to modulate the intensity of the light emitted from said first ends, and means for supplying said time-variant signal to said modulating means to control the operation thereof.

3. A system for providing a luminous indication which is representative of the instantaneous amplitude of a time-variant signal, said system comprising a plurality of light-conducting members having first ends thereof disposed in a pre-selected array, said luminous indication being formed by the light emitted from said first ends, each of said light-conducting members having material which fluoresces in response to the reception of energy at a selected wavelength distributed throughout an extended longitudinal region thereof, the degree of fluorescence and the light attenuation of each light-conducting member being so selected that the light reaching said first end thereof is a function of the distance from said first end at which said member is illuminated by energy at said wavelength, a source of energy at said wavelength, means associated with said source for directing said energy against selected spots on the longitudinal surfaces of said regions of said light-conducting means in a selected sequence, signal responsive modulating means adapted to control the distance from said first end at which each of said members is illuminated by said source, and means for supplying said time-variant signal to said modulating means to control the operation thereof.

4. A system as recited in claim 3 wherein said elongated regions of said light conducting members provide an appreciable attenuation of the conducted light per unit of length, thereby to cause the light reaching said first end to be a function of the distance from said first end at which said member is illuminated.

5. A system for providing a luminous indication which is representative of the instantaneous amplitude of a time-variant signal, said system comprising a plurality of spaced, parallel, coplanar light-conducting members having first ends thereof disposed in a line, said luminous indication being formed by the light emitted from said first ends, each of said light-conducting members having material which fluoresces in response to the reception of energy at a selected wavelength distributed throughout an extended longitudinal region thereof, the degree of fluorescence and the light attenuation of each light-conducting member being so selected that the light reaching said first end thereof is a function of the distance from said first end at which said member is illuminated, a localized source of energy at said wavelength, means associated with said source for causing said source to illuminate the longitudinal surface of selected ones of said regions, said regions of said light-conducting means being illuminated in sequence, position modulating means responsive to said time-variant signal and adapted to control the distance from said first end at which each of said members is illuminated by said source, and means for supplying said time-variant signal to said position modulating means to control the operation thereof.

6. A system for providing a luminous indication which is representative of the instantaneous amplitude of a time-variant signal, said system comprising a cathode-ray tube indicator which includes means for generating a cathode-ray beam, a screen which is adapted to emit energy at a selected wavelength at the point of impingement of said beam thereon, means for deflecting said beam in a first direction across said screen, and means responsive to said time-variant signal for modulating said beam in accordance with the instantaneous amplitude of said time-variant signal, a plurality of elongated, light-conducting members, each of said members having a region thereof in proximity to said screen, said region of said light-conducting members being oriented with respect to said screen so as to receive energy in a predetermined sequence as a result of the deflection of said beam in said first direction, said energy being received on the longitudinal surface of each of said light-conducting members, the regions of said light-conducting members in the vicinity of said screen having material which fluoresces in response to the reception of energy at said selected wavelength distributed therethrough, the ends of said light-conducting members being disposed in an array to provide said luminous indication.

7. A system as recited in claim 6 wherein said means responsive to said time-variant signal for modulating said beam in accordance with the instantaneous amplitude of said time-variant signal comprises means for modulating the intensity of said beam in accordance with the instantaneous amplitude of said time-variant signal.

8. A system in accordance with claim 6 wherein said means responsive to said time-variant signal for modulating said beam in accordance with the instantaneous amplitude of said time-variant signal comprises means for position modulating said beam in a direction at right angles to said first direction, each of said light-conducting members having a degree of fluorescence and a light attenuation such that the light emitted from said arrayed ends is a function of the distance from the arrayed end at which said member is illuminated.

9. A system for providing a luminous indication which is representative of the instantaneous amplitude of a time-variant signal, said system comprising a cathode-ray tube indicator which includes means for generating a cathode-ray beam, a screen which is adapted to emit energy of a selected wavelength at the point of impingement of said beam thereon, means for deflecting said beam in a first direction across said screen, means responsive to said time-variant signal for deflecting said beam in a second direction at right angles to said first direction, the amount of deflection in said second direction being a function of the instantaneous amplitude of said time-variant signal, a plurality of elongated, light-conducting members disposed in a coplanar spaced, parallel array in front of said screen, the first ends of said members being disposed in a line, the longer dimension of said members being substantially parallel to said second direction, the region of each light-conducting member in the vicinity of said screen having material which fluoresces in response to the reception of energy at said selected wavelength distributed therethrough, the degree of fluorescence and the light attenuation of each of said members being so selected that the intensity of the light reaching said first end thereof is a function of the deflection of said beam in said second direction at the point of illumination.

10. A system for providing a photographic recording of the instantaneous amplitude of a time-variant signal, said system comprising a cathode-ray tube indicator which includes means for generating a cathode-ray beam, a screen which is adapted to emit energy of a selected wavelength at the point of impingement of said beam thereon, means for deflecting said beam in a first direction across said screen, means responsive to said time-variant signal for deflecting said beam in a second direction at right angles to said first direction, the amount of deflection in said second direction being a function of the instantaneous amplitude of said time-variant signal, a plurality of elongated, light-conducting members disposed in a coplanar spaced, parallel array in front of said screen, the first ends of said members being disposed in a line, said longer dimension of said members being substantially parallel to said second direction, the region of each light-conducting member in the vicinity of said screen having material which fluoresces in response to the reception of energy at said selected wavelength distributed therethrough, the degree of fluorescence and the light attenuation of each of said members being so selected that the intensity of the light reaching said first end thereof is a function of the deflection of said beam in said second direction at the point of illumination, a sensitized photographic film disposed in proximity to said first ends of said light-conducting members, and means for transporting said film in a direction transverse to said line.

11. A light source comprising an elongated, rod-like, light conducting member, said light conducting member having material which fluoresces in response to the reception of energy at a selected wavelength distributed internally throughout an extended longitudinal region thereof, a source of energy at said wavelength and means associated with said source of energy for directing said energy at selected points in the longitudinal surface of said fluorescent region of said light conducting member.

12. A light source as recited in claim 11, said light source further comprising means associated with said source of energy at said selected wavelength for controlling the intensity of the energy directed at said selected points in said fluorescent region.

13. A light source comprising an elongated, rod-like, light conducting member, said light conducting member having an extended region remote from a first end of said member which fluoresces internally in response to the reception of energy at a selected wavelength on the longitudinal surface of said region, the degree of fluorescence and the light attenuation of the various regions of said light conducting member being so selected that the light reaching said first end undergoes a pronounced variation with variations of the point in said fluorescent region at which said light conducting member is illuminated, a source of energy at said selected wavelength, means associated with said source of energy for directing said energy at a selected smaller region in said elongated fluorescent region, said last mentioned means including means for controlling said energy to vary the position of said selected smaller region within said elongated region.

14. A system for providing a luminous indication which is representative of the instantaneous amplitude of a time-variant signal, said system comprising a plurality of light-conducting members having first ends thereof disposed in a preselected array, said luminous indication being formed by the light emitted from said first ends, each of said light-conducting members having material which fluoresces in response to the reception of energy at a selected wavelength distributed internally throughout an extended longitudinal region thereof, a source of energy at said wavelength, means associated with said source for directing said energy against selected spots on the longitudinal surfaces of selected ones of said light-conducting members thereby to illuminate said light-conducting members with said energy, said illumination taking place at said regions containing said fluorescent material, signal responsive modulating means for modifying the illumination of said light-conducting members in accordance with the amplitude of a signal supplied thereto thereby to modulate the intensity of the light emitted from said first ends, and means for supplying a time-variant signal to said modulating means.

15. A system for providing a luminous indication which is representative of the instantaneous amplitude of a time-variant signal, said system comprising a plurality of light-conducting members having first ends thereof disposed in a preselected array, said luminous indication being formed by the light emitted from said first ends, each of said light-conducting members having material which fluoresces in response to the reception of energy at a selected wavelength distributed internally throughout an extended longitudinal region thereof, the degree of fluorescence and the light attenuation of each light-conducting member being so selected that the light reaching said first end thereof is a function of the distance from said first end at which said member is illuminated by energy at said wavelength, a source of energy at said wavelength, means associated with said source for directing said energy against selected spots on the longitudinal surfaces of said regions of said light-conducting means in a selected sequence, signal responsive modulating means adapted to control the distance from said first end at which each of said members is illuminated by said source, and means for supplying said time-variant signal to said modulating means to control the operation thereof.

16. A system for providing a luminous indication which is representative of the instantaneous amplitude of a time-variant signal, said system comprising a cathode-ray tube indicator which includes means for generating a cathode-ray beam, a screen which is adapted to emit energy at a selected wavelength at the point of impingement of said beam thereon, means for deflecting said beam in a first direction across said screen, and means responsive to said time-variant signal for modulating said beam in accordance with the instantaneous amplitude of said time-variant signal, a plurality of elongated, light-conducting members, each of said members having a side region thereof in proximity to said screen, said region of said light-conducting members being oriented with respect to said screen so as to receive energy in a predetermined sequence as a result of the deflection of said beam in said first direction, said energy being received on the longitudinal surface of each of said light-conducting members, the regions of said light-conducting members in the vicinity of said screen having material which fluoresces in response to the reception of energy at said selected wavelength distributed internally therethrough, the ends of said light-conducting members being disposed in an array to provide said luminous indication.

17. A system for providing a luminous indication which is representative of the instantaneous amplitude of a time-variant signal, said system comprising a cathode-ray tube indicator which includes means for generating a cathode-ray beam, a screen which is adapted to emit energy at a selected wavelength at the point of impingement of said beam thereon, means for deflecting said means in a first direction across said screen, means responsive to said time-variant signal for deflecting said beam in a second direction at right angles to said first direction, the amount of deflection in said second direction being a function of the instantaneous amplitude of said time-variant signal, a plurality of elongated, light-conducting members disposed in a coplanar spaced, parallel array in front of said screen, the first ends of said members being disposed in a line, the longer dimension of said members being substantially parallel to said second direction, the region of each light-conducting member in the vicinity of said screen having material which fluoresces in response to the reception of energy at said selected wavelength distributed internally therethrough, the degree of fluorescence and the light attenuation of each of said members being so selected that the intensity of the light reaching said first end thereof is a function of the deflection of said beam in said second direction at the point of illumination.

References Cited in the file of this patent

UNITED STATES PATENTS

| | | |
|---|---|---|
| 2,091,152 | Malpica | Aug. 24, 1937 |
| 2,309,117 | John | Jan. 26, 1943 |
| 2,388,203 | Zindel | Oct. 30, 1945 |
| 2,506,672 | Kell et al. | May 9, 1950 |
| 2,825,260 | O'Brien | Mar. 4, 1958 |
| 2,901,632 | Stava et al. | Aug. 25, 1959 |